(12) United States Patent
Morita

(10) Patent No.: US 10,763,693 B2
(45) Date of Patent: Sep. 1, 2020

(54) BACK-UP POWER SOURCE DEVICE AND BACK-UP SYSTEM

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventor: Kyohei Morita, Mie (JP)

(73) Assignees: AutoNetworks Technologies, Ltd., Yokkaichi, Mie (JP); Sumitomo Wiring Sytems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 43 days.

(21) Appl. No.: 16/318,265

(22) PCT Filed: Jun. 28, 2017

(86) PCT No.: PCT/JP2017/023681
§ 371 (c)(1),
(2) Date: Jan. 16, 2019

(87) PCT Pub. No.: WO2018/016277
PCT Pub. Date: Jan. 25, 2018

(65) Prior Publication Data
US 2019/0165602 A1    May 30, 2019

(30) Foreign Application Priority Data
Jul. 19, 2016 (JP) .................................. 2016-141158

(51) Int. Cl.
*H02J 9/06* (2006.01)
*B60R 16/033* (2006.01)
(Continued)

(52) U.S. Cl.
CPC ............ *H02J 9/061* (2013.01); *B60R 16/033* (2013.01); *B60T 1/06* (2013.01); *F16H 59/08* (2013.01);
(Continued)

(58) Field of Classification Search
CPC ........................................................ H02J 9/061
See application file for complete search history.

(56) References Cited

U.S. PATENT DOCUMENTS 9,103,436 B2 * 8/2015 Al-Regib ................ F16H 61/12
2005/0253458 A1 * 11/2005 Omae .................... H02J 7/1423
307/10.1
(Continued)

FOREIGN PATENT DOCUMENTS

| JP | H6-050423 A | 2/1994 |
| JP | 2008-133931 A | 6/2008 |

OTHER PUBLICATIONS

Wikipedia contributors. "Shift by wire." Wikipedia, The Free Encyclopedia. Wikipedia, The Free Encyclopedia, Mar. 28, 2020. Web. Apr. 27, 2020 (Year: 2020).*

(Continued)

*Primary Examiner* — Daniel J Cavallari
(74) *Attorney, Agent, or Firm* — Honigman LLP

(57) ABSTRACT

A back-up control unit of a back-up power source device executes: a battery failure determination process of determining whether or not a battery failure has been detected by a failure detecting unit; when it is determined that battery failure has been detected in the battery failure determination process, a switching instruction determination process for determining, on the basis of an instruction signal from a monitor circuit, whether or not an instruction to switch to a P range has been made by a user; and when it is determined that a switching instruction has been made in the switching (Continued)

instruction determination process, a shifting instruction process for starting power supply from a back-up power source to a shift control unit and instructing the shift control unit to shift to the P range.

8 Claims, 4 Drawing Sheets

(51) Int. Cl.
  *F16H 61/12* (2010.01)
  *F16H 63/48* (2006.01)
  *F16H 59/08* (2006.01)
  *F16H 59/50* (2006.01)
  *F16H 61/22* (2006.01)
  *F16H 61/28* (2006.01)
  *B60T 1/06* (2006.01)
  *F16H 63/34* (2006.01)

(52) U.S. Cl.
  CPC ............. *F16H 59/50* (2013.01); *F16H 61/12* (2013.01); *F16H 61/22* (2013.01); *F16H 61/28* (2013.01); *F16H 63/34* (2013.01); *F16H 63/48* (2013.01)

(56) References Cited

U.S. PATENT DOCUMENTS

| 2008/0173121 | A1 | 7/2008 | Kimura et al. | |
|---|---|---|---|---|
| 2008/0302628 | A1 | 12/2008 | Kimura et al. | |
| 2016/0059722 | A1* | 3/2016 | Nate | B60L 58/20 320/109 |
| 2016/0185240 | A1* | 6/2016 | Horitake | B60L 53/00 307/10.1 |

OTHER PUBLICATIONS

International Search Report, Application No. PCT/JP2017/023681, dated Sep. 26, 2017.

* cited by examiner

BACK-UP POWER SOURCE DEVICE AND BACK-UP SYSTEM

CROSS-REFERENCE TO RELATED APPLICATIONS

This application is the U.S. national stage of PCT/JP2017/023681 filed Jun. 28, 2017, which claims priority of Japanese Patent Application No. JP 2016-141158 filed Jul. 19, 2016.

TECHNICAL FIELD

The technique disclosed in the present specification relates to back-up power source devices and back-up systems, and particularly relates to a technique for supplying back-up power to a shift control unit included in what is known as a "shift-by-wire" device, which is provided in a vehicle and switches the shift range of an automatic transmission using the driving force of a motor, in the event of a battery failure.

BACKGROUND

Patent Document 1, for example, is known as a conventional technique for supplying back-up power to a shift control unit included in a shift-by-wire device provided in a vehicle, as mentioned above. Patent Document 1 discloses a technique for supplying back-up power from a capacitor (a back-up power source) to an SBW-ECU (shift control unit) when a power source such as a battery, a wire in a power supply system, or the like provided in a vehicle has malfunctioned, i.e., in the event of a battery failure causing the supply of power from the battery to be lost. According to the technique disclosed in this document, a control signal from the SBW-ECU supplied with power switches the shift range of an automatic transmission to the parking range (P range), which makes it possible to safely park the vehicle.

However, as mentioned in the aforementioned document as well, a user of a vehicle may wish to specify the timing at which the shift range is switched to the parking range (P range) in order to park the vehicle in a predetermined location in the event of a battery failure. In this case, according to the technique of the aforementioned document, it is necessary to supply power from the back-up power source to the SBW-ECU from when the battery failure has occurred to when the parking range (P range) is switched to. There is thus a problem in that the capacity of the back-up power source must be high enough to provide the required supply. A higher capacity increases the size of the back-up power source.

For design purposes and the like, it is also conceivable that the back-up power source device which controls the supply of power from the back-up power source, such as a capacitor, to the SBW-ECU (the shift control unit), is provided separate from the shift control unit. Thus what is needed is a technique in which a back-up power source can be used efficiently in a situation where, in the event of a battery failure, the shift range is to be switched to the parking range in response to a user instruction, and where the back-up power source device and the shift control unit are provided separately.

Having been achieved on the basis of circumstances such as those described above, the technique disclosed in the present specification provides a back-up power source device which, in the event of a battery failure, can efficiently use a back-up power source for a shift control unit when switching a shift range to the parking range in response to a user instruction, and which can be made smaller.

SUMMARY

A back-up power source device disclosed in the present specification is a back-up power source device including a shift-by-wire device that switches a shift range of an automatic transmission using driving force from a motor and a back-up power source that supplies power to the shift-by-wire device, the back-up power source device supplying power from the back-up power source to a shift control unit included in the shift-by-wire device in the event of a battery failure in which the supply of power from a battery is lost, the back-up power source device further including: a failure detection unit that detects the battery failure; a monitor unit that, when the battery failure has been detected by the failure detection unit, monitors a user's operation of a switch instructing unit that instructs the shift range to be switched to a parking range, and generates an instruction signal in response to the operation of the switch instructing unit; and a back-up control unit, wherein the back-up control unit executes: a battery failure determination process of determining whether or not the battery failure has been detected by the failure detection unit; when it is determined that the battery failure has been detected in the battery failure determination process, a switching instruction determination process of determining, on the basis of the instruction signal generated by the monitor unit, whether or not the instruction to switch has been made; and when it is determined that the instruction to switch has been made in the switching instruction determination process, a shifting instruction process of starting power supply from the back-up power source to the shift control unit and instructing the shift control unit to shift to the parking range.

According to this configuration, the back-up control unit starts the supply of power to the shift control unit and instructs the shift control unit to shift to the parking range when it has been determined that the user has instructed a switch to the parking range in the event of a battery failure. As such, no power is supplied from the back-up power source to the shift control unit in a period spanning from when the battery failure has occurred to when the user makes the instruction to switch to the parking range. As a result, power is not needlessly supplied from the back-up power source to the shift control unit. Thus with the back-up power source device according to this configuration, the back-up power source can be used efficiently for the shift control unit when switching the shift range to the parking range in response to a user instruction made in the event of a battery failure. The capacity of the back-up power source can be reduced, and the back-up power source can be made smaller and lighter as a result. Note that "battery failure" includes a dead battery, a power line connected to the battery being disconnected from the battery, the power line being cut partway along the line, and so on.

In the above-described back-up power source device, the monitor unit may monitor a parking range switch that, functioning as the switch instructing unit, indicates a shift to the parking range, and a door switch that, functioning as the switch instructing unit, indicates whether a door of the vehicle is open or closed; and in the switching instruction determination process, the back-up control unit may determine that the instruction to switch has been made in the case where an instruction signal indicating that the parking range switch has turned on or an instruction signal indicating that the door switch has been turned on has been received.

According to this configuration, the parking range switch and the door switch provided in the vehicle can be used as the switch instructing unit through which the user makes an instruction to switch to the parking range in the event of a battery failure. It is thus unnecessary to provide the vehicle with an additional configuration for making switching instructions.

Additionally, in the above-described back-up power source device, the back-up control unit may further execute a prohibition process of prohibiting the supply of power from the back-up power source to the shift control unit when it has been determined that the battery failure has been detected in the battery failure determination process.

According to this configuration, the supply of power from the back-up power source to the shift control unit can be reliably prevented from starting at the same time as the occurrence of a battery failure.

Additionally, in the above-described back-up power source device, the back-up power source may be constituted by a capacitor.

Additionally, a back-up system disclosed in the present specification includes: any one of the above-described back-up power source devices; a shift-by-wire device including the shift control unit; and a body control module that can be connected to a door switch that, functioning as the switch instructing unit, indicates whether a door of a vehicle is open or closed, wherein the shift control unit executes a process of shifting to the parking range in response to an instruction to shift to the parking range from the back-up control unit.

According to this configuration, it is possible to provide a back-up system in which the back-up power source can be used efficiently for the shift control unit when switching the shift range to the parking range in response to a user instruction made in the event of a battery failure.

Advantageous Effects of Disclosure

According to the back-up power source device disclosed in the present specification, the capacity of a back-up power source for a shift control unit used when switching the shift range to the parking range in response to a user instruction made in the event of a battery failure can be reduced, and the back-up power source can be made smaller.

DETAILED DESCRIPTION OF PREFERRED EMBODIMENTS

Figure 1:
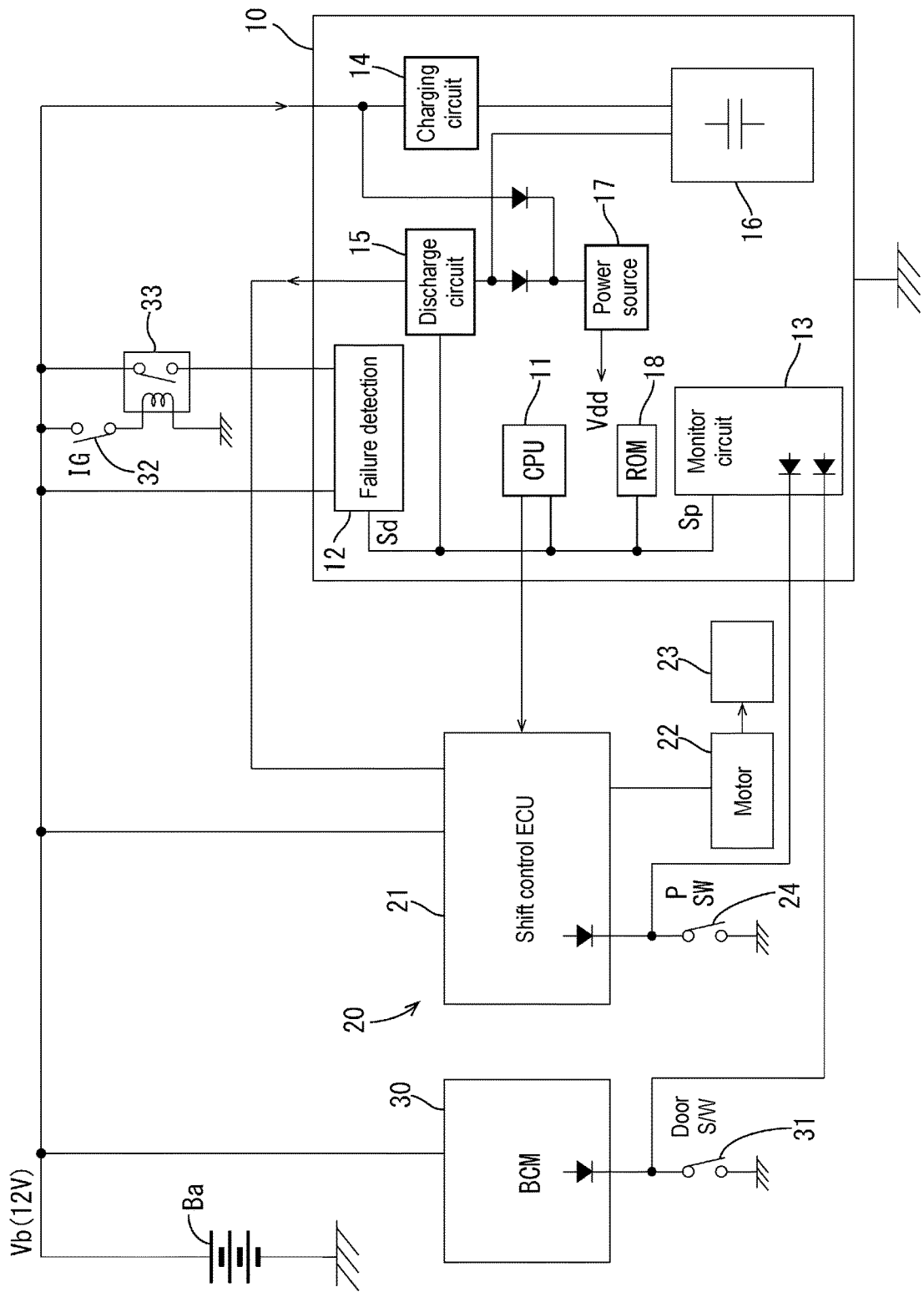
FIG. 1 is a general block diagram illustrating a back-up system according to an embodiment.

A back-up system 1 according to an embodiment will be described with reference to FIGS. 1 to 3.

1. Configuration of Back-Up System

The back-up system 1 is installed in a vehicle, and includes a back-up power source device 10, a shift-by-wire (SBW) device 20, a body control module 30, a battery Ba, and the like. The vehicle may be a gasoline engine automobile, an HV that uses both a gasoline engine and motor driving, or an EV that uses motor driving exclusively. In other words, the vehicle may be any vehicle including a shift-by-wire device.

The shift-by-wire device 20 includes a shift control ECU 21, a motor 22, an automatic transmission 23, a parking range switch ("P range switch" hereinafter) 24, and the like. The shift control ECU 21 includes a CPU, for example, and controls the motor 22 so that the shift range of the automatic transmission 23 is switched by driving force from the motor 22. The shift range includes, for example, a drive range (D range), a reverse range (R range), a neutral range (N range), a parking range ("P range" hereinafter), and the like. The shift control ECU 21 is an example of a "shift control unit".

The P range switch 24 normally switches the shift range of the automatic transmission 23 to the P range by being pressed by the user when parking. The user also uses the P range switch 24 to instruct a switch to the P range when the battery Ba has failed, as will be described later. Likewise, the user uses a door switch 31, which is installed in a door of the vehicle and connected to the BCM 30, to instruct a switch to the P range when the battery Ba has failed, as will be described later. Here, the P range switch 24 and the door switch 31 are examples of a "switch instructing unit" that instructs a switch to the P range in response to a user operation.

An ignition (IG) switch 32 is connected to a coil of a relay 33. When the IG switch 32 is turned on, the coil is excited, a contact point goes conductive, and a 12 V battery voltage Vb is applied to a failure detection circuit 12 of the back-up power source device 10, which will be described later.

2. Configuration of Back-Up Power Source Device

The back-up power source device 10 is provided in the vehicle in which the shift-by-wire device 20 is installed. The back-up power source device 10 is provided separate from the shift control ECU 21 included in the shift-by-wire device 20, and supplies back-up power to the shift control ECU 21 in the event of a battery failure, when the supply of power from the battery Ba provided in the vehicle is lost.

As illustrated in FIG. 1, the back-up power source device 10 includes a CPU 11, the failure detection circuit 12, a monitor circuit 13, a charging circuit 14, a discharge circuit 15, a capacitor 16, a power source circuit 17, a ROM 18, and the like.

The CPU 11 controls the back-up power source device 10 as a whole in accordance with programs stored in the ROM 18. The CPU 11 also executes a back-up process for battery failures, which will be described later, in the event of a battery failure.

Specifically, in the back-up process, the CPU 11 executes the following: a battery failure determination process of determining whether or not a battery failure has been detected; when it is determined that battery failure has been detected in the battery failure determination process, a switching instruction determination process of determining, on the basis of an instruction signal Sp from the monitor circuit 13, whether or not a switching instruction has been made; and when it is determined that a switching instruction has been made in the switching instruction determination process, a shifting instruction process of starting power supply from the capacitor 16 to the shift control ECU 21 and instructing the shift control ECU 21 to shift to the P range. When it has been determined that a battery failure has been detected in the battery failure determination process, the CPU 11 further executes a prohibition process for prohibiting the supply of power from the capacitor 16 to the shift control ECU 21. The CPU 11 is an example of a "back-up control unit".

The failure detection circuit 12 detects battery failures. Specifically, in the present embodiment, the failure detection circuit 12 monitors the battery voltage Vb (12 V) direct from the battery Ba and the battery voltage Vb via the relay 33, generates a detection signal Sd indicating a battery failure in the event that both battery voltages Vb are not detected, and supplies the detection signal Sd to the CPU 11, as illustrated in FIG. 1. If the battery voltage Vb direct from the battery Ba is detected but the battery voltage Vb via the relay 33 is not detected, this does not indicate battery failure, but rather indicates simply that the IG switch 32 has been turned off. Thus in this case, the failure detection circuit 12 does not generate the detection signal Sd. The failure detection circuit 12 is an example of a "failure detection unit". The failure detection circuit 12 is constituted by known circuits such as a voltage detection circuit, an AND circuit, and the like.

When a battery failure has been detected by the failure detection circuit 12, the monitor circuit 13 monitors the P range switch 24, which makes an instruction to switch to the parking range, and the door switch 31, which indicates whether a door of the vehicle is open or closed, and generates the instruction signal Sp in response to the P range switch 24 or the door switch 31 being operated. Specifically, in the present embodiment, a detection terminal of the monitor circuit 13 is pulled up and connected to the P range switch 24 and the door switch 31, for example, as illustrated in FIG. 1. Then, when a battery failure occurs, and the P range switch 24 or the door switch 31 is turned on by the user, the detection terminal of the monitor circuit 13 is pulled down; as a result, the monitor circuit 13 detects the instruction made by the user to switch to the P range, and generates the instruction signal Sp. Note that the door switch 31 is turned on in response to the user opening the door. The instruction signal Sp is supplied to the CPU 11. The monitor circuit 13 is an example of a "monitor unit".

The charging circuit 14 receives the battery voltage Vb of 12 V and converts that voltage into a voltage of 11 V, for example. The charging circuit 14 then controls a charging current in accordance with the charge state of the capacitor 16.

The discharge circuit 15 includes, for example, a semi-conductor switch circuit (not shown), and supplies power from the capacitor 16 to the shift control ECU 21 in the event of a battery failure by turning the switch circuit on in response to a command from the CPU 11. Normally, the switch circuit is turned off, and no power is supplied from the capacitor 16 to the shift control ECU 21.

In the event of a battery failure, the capacitor 16 supplies power to the internal circuitry of the back-up power source device 10, such as the CPU 11, and the shift control ECU 21. In other words, the capacitor 16 serves as a source for supplying back-up power. As such, the capacitor 16 has a storage capacity capable at least of using the shift control ECU 21 to switch the shift range to the P range in the event of a battery failure. The capacity of the capacitor 16 is determined as appropriate in advance through experimentation or the like, in accordance with a setting value for the amount of elapsed time from when a battery failure has occurred to when the P range is switched to (see K1 in FIG. 3), a load capacity during the battery failure, and the like. The capacitor 16 is an example of a "back-up power source". Note that the back-up power source is not limited to the capacitor 16, and may be a secondary battery or the like, for example.

The power source circuit 17 is, for example, connected to the battery Ba and the capacitor 16 via respective diodes, as illustrated in FIG. 1. Normally, power is supplied to the power source circuit 17 from the battery Ba, but in the event of a battery failure, power is automatically supplied from the capacitor 16. The power source circuit 17 converts the received voltage to a predetermined power source voltage Vdd, and supplies the power source voltage Vdd to the various units of the back-up power source device 10.

3. Back-Up Process in the Event of Battery Failure

A back-up process in the event of battery failure, executed by the CPU 11 on the basis of predetermined programs, will be described next with reference to FIGS. 2 and 3. Although time t1 and time t2, time t2 and time t4, and time t3 and time t4 correspond to substantially the same times, these times are illustrated with gaps therebetween in FIG. 3 for descriptive purposes. Also, the order of processes illustrated in the flowchart of FIG. 2 is merely an example.

Figure 2:
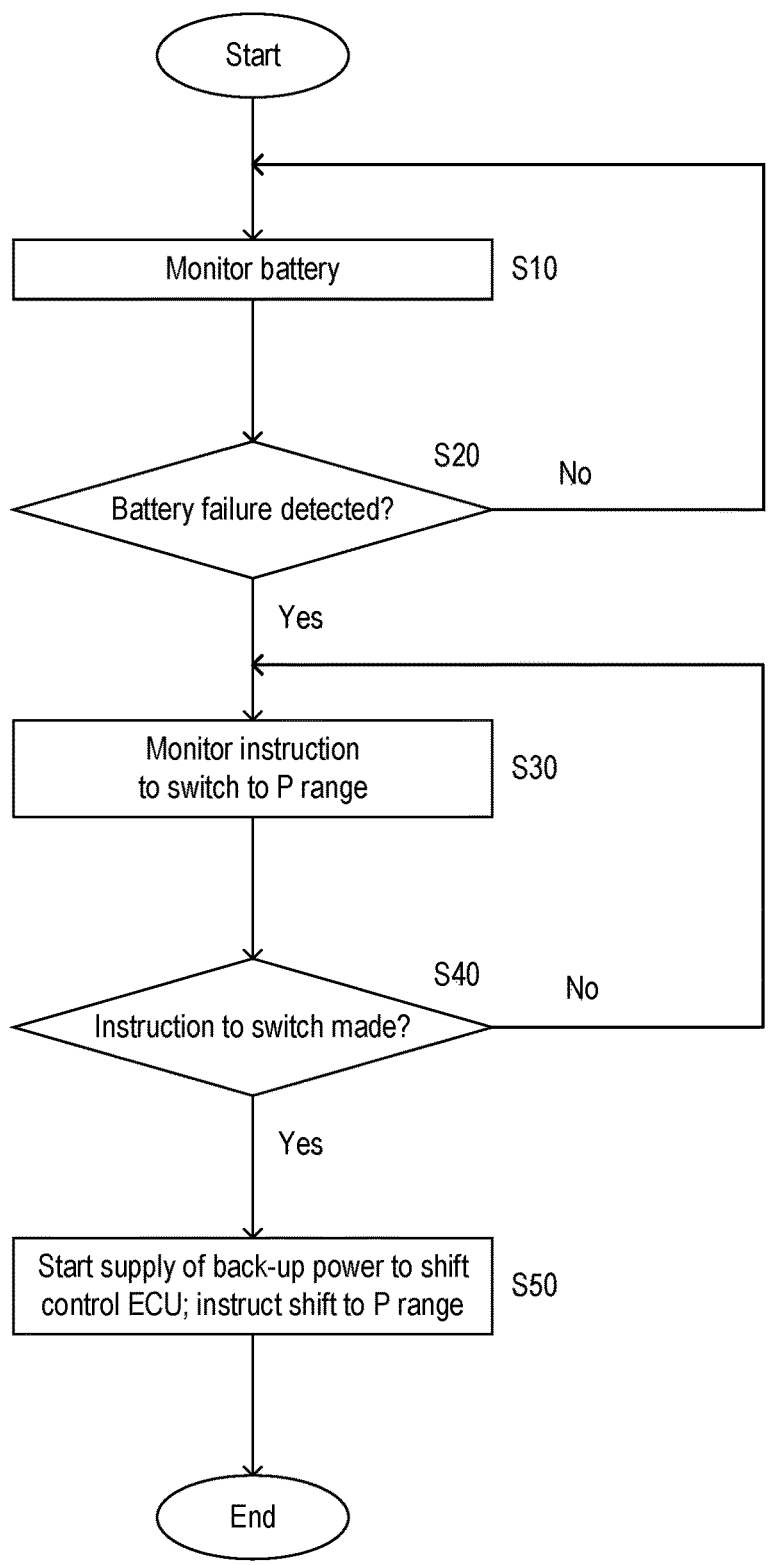
FIG. 2 is a general flowchart illustrating a back-up power supply process.
Figure 3:
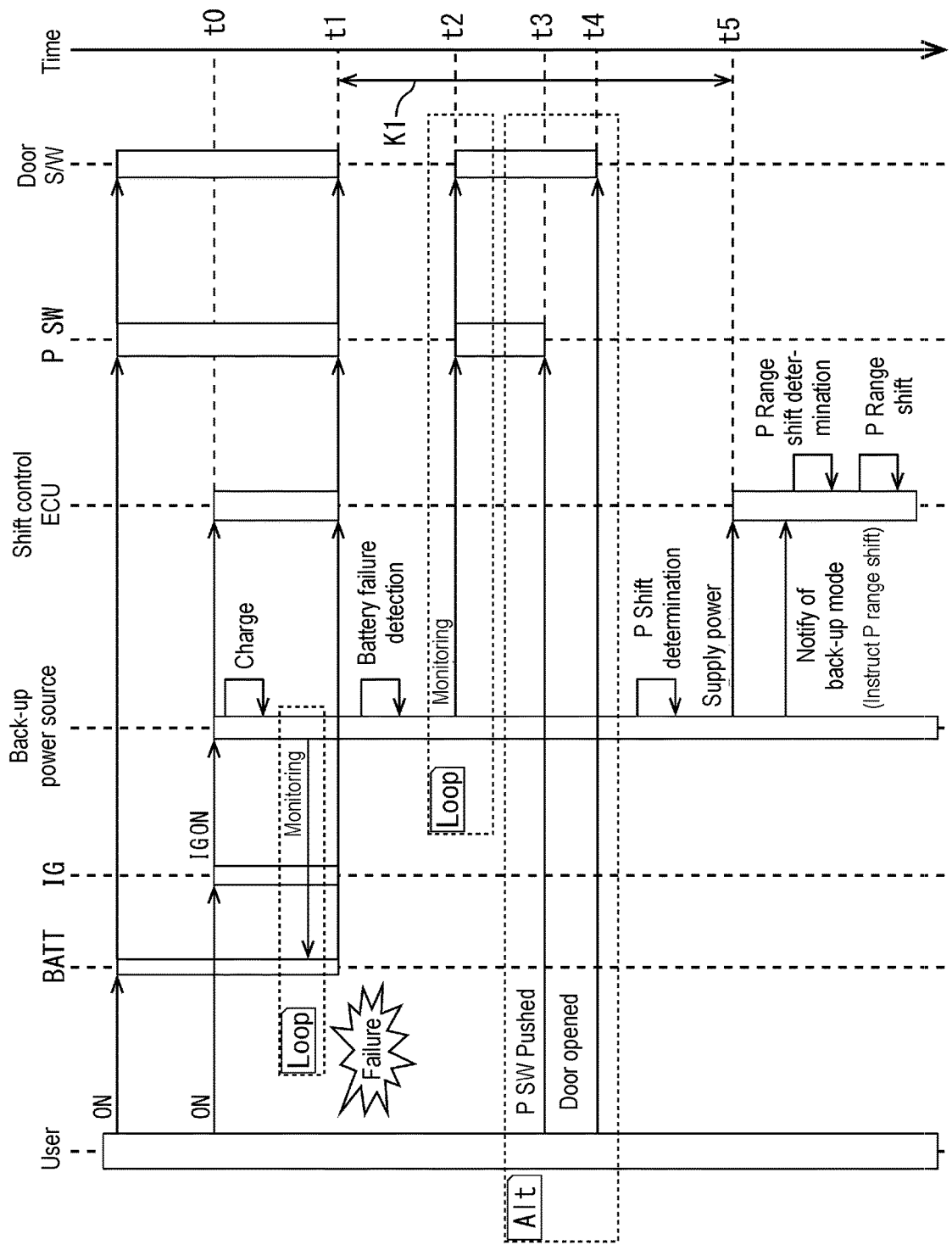
FIG. 3 is a general sequence chart illustrating the back-up power supply process.

When, at time t0 in FIG. 3, the IG switch 32 is turned on by the user, the CPU 11 monitors the battery voltage Vb through the failure detection circuit 12 (step S10 in FIG. 2). During this monitoring, the CPU 11 determines whether or not a battery failure has been detected by the failure detection circuit 12 (step S20: the battery failure determination process). Specifically, it is determined whether or not the detection signal Sd, indicating a battery failure, has been received from the failure detection circuit 12. If it is determined that a battery failure has not been detected, i.e., that the detection signal Sd has not been received (step S20: NO), the process returns to step S10. In other words, the processes of steps S10 and S20 correspond to a looped process that is repeated every predetermined amount of time.

On the other hand, if it is determined in step S20 that a battery failure has been detected, i.e., that the detection signal Sd has been received (step S20: YES), the process moves to step S30. This corresponds to time t1 in FIG. 3. In other words, it is assumed that at time t1 in FIG. 3, a power line has been disconnected from the battery Ba and a battery failure has occurred as a result, for example. Thus at this time, the CPU 11 keeps the switch circuit of the discharge circuit 15 off, and prohibits the supply of power from the capacitor 16 to the shift control ECU 21 (the prohibition process). In other words, the supply of power to the shift control ECU 21, the P range switch 24, and the door switch 31 is cut off at time t1 in FIG. 3.

At time t2, which is close to time t1, the CPU 11 supplies power to the P range switch 24 and the door switch 31 via the monitor circuit 13, and starts monitoring the states of the P range switch 24 and the door switch 31 (step S30). During the monitoring, the CPU 11 determines whether or not the user has made an instruction to switch to the P range (step S40: the switching instruction determination process). Specifically, it is determined whether or not the instruction signal Sp has been received from the monitor circuit 13. If it is determined that an instruction to switch to the P range has not been made, i.e., that the instruction signal Sp has not been received (step S40: NO), the process returns to step S30. In other words, the processes of steps S30 and S40 correspond to a looped process that is repeated every predetermined amount of time.

On the other hand, if it is determined in step S40 that an instruction to switch to the P range has been made, i.e., that the instruction signal Sp has been received (step S40: YES), the process moves to step S50. This corresponds to time t3 or time t4 in FIG. 3. In other words, it is assumed that the P range switch 24 is turned on by the user at time t3 in FIG. 3, and that the door is opened by the user and the door switch 31 is turned on at time t4 in FIG. 3.

As such, the CPU 11 determines that an instruction to shift to the P range has been made by the user (corresponding to time t5). Then, in step S50, the CPU 11 starts the supply of power from the capacitor 16 to the shift control ECU 21 (the supply of back-up power), and notifies the shift control ECU 21 of the start of a back-up mode, i.e., instructs the shift control ECU 21 to shift to the P range (the shifting instruction process).

As a result, the shift control ECU 21 determines that the back-up mode has been started and it is necessary to shift to the P range, and thus drives the motor 22 to switch the shift range of the automatic transmission 23 to the P range (a shifting process). The vehicle can therefore be safely parked in the event of a battery failure.

4. Comparative Example

Figure 4:
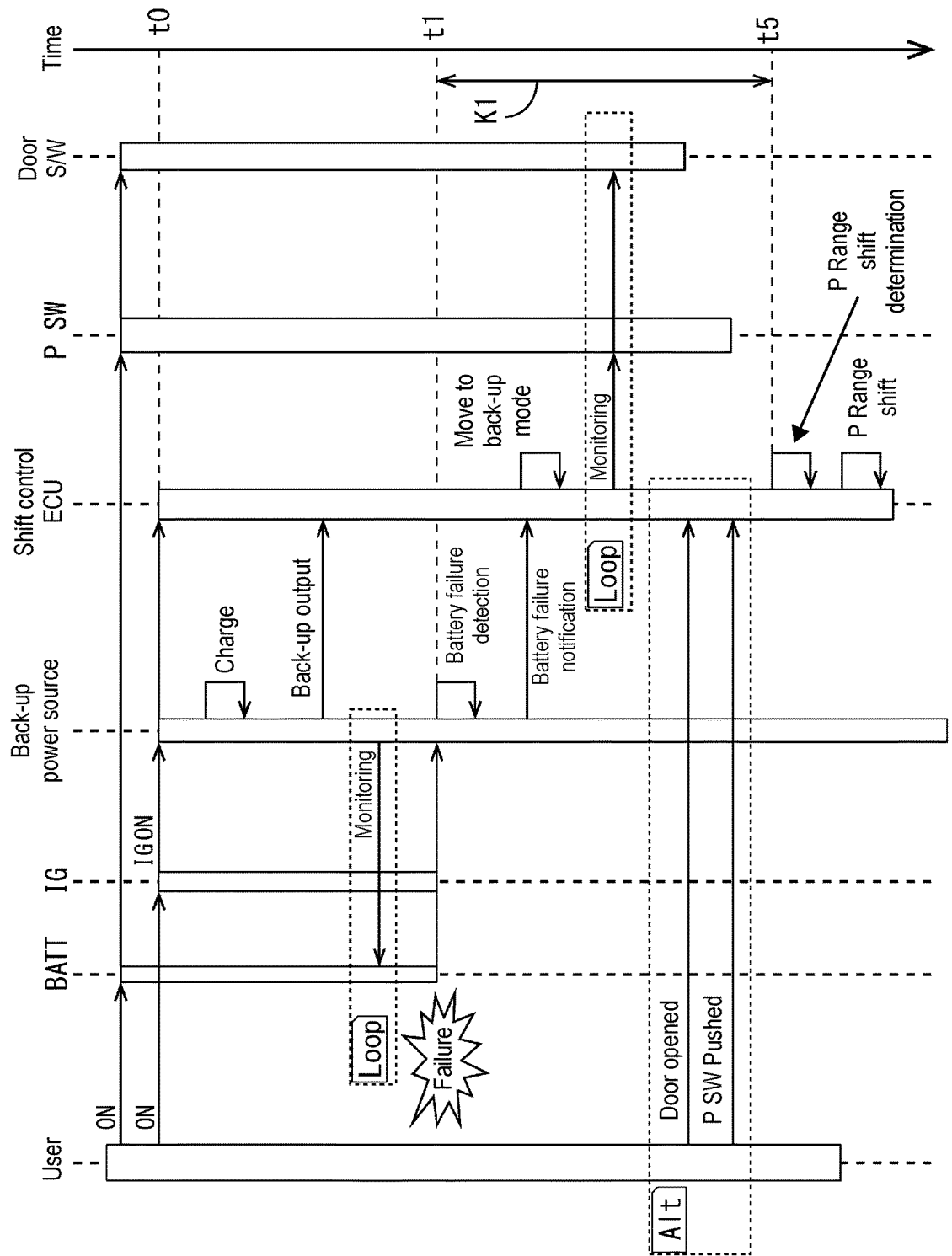
FIG. 4 is a general sequence chart illustrating a comparative example of a back-up power supply process.

FIG. 4 illustrates a comparative example in a situation where the back-up power source device 10 is provided separate from the shift control ECU 21. The comparative example is the same as the present embodiment in that power is supplied from the capacitor 16 to the shift control ECU 21 in the event of a battery failure, but the supply method is different. That is, in the comparative example, the supply of power from the capacitor 16 to the shift control ECU 21 is started automatically at time t1 in FIG. 4 when a battery failure has occurred. This is carried out using two diodes, for example, as in the above-described method in which the supply of power from the capacitor 16 to the power source circuit 17 of the back-up power source device 10 is started in the event of a battery failure.

Then, in the comparative example, the shift control ECU 21 monitors an instruction to shift to the P range made by the user, and shifts to the P range upon determining that the instruction to shift has been made (time t5). In other words, in the comparative example, power continues to be supplied from the capacitor 16 to the shift control ECU 21 throughout a period K1, which spans from time t1, where the battery failure is detected, to time t5, where the P range is shifted to. This period K1 covers an amount of time from, for example, when the user notices a battery failure while driving the vehicle, moves the vehicle to a safe location, and stops the vehicle, to when the user pushes the P range switch 24 or opens the door. The period K1 is several minutes, for example.

However, in the present embodiment, no power is supplied from the capacitor 16 to the shift control ECU 21 during the period K1, as illustrated in FIG. 3. Accordingly, compared to the comparative example, the present embodiment can reduce the amount of power supplied to the shift control ECU 21 in the event of a battery failure, and thus the capacity of the capacitor 16 can be reduced, i.e., the capacitor 16 can be made smaller and lighter.

5. Effects of Present Embodiment

In the present embodiment, upon determining that the user has made an instruction to switch to the P range in the event of a battery failure (step S40: YES), the CPU 11 starts the supply of power to the shift control ECU 21 and instructs the shift control ECU 21 to shift to the P range. As such, no power is supplied from the capacitor 16 to the shift control ECU 21 in the period K1, which spans from when the battery failure has occurred (time t1) to when the user makes the instruction to switch to the parking range and the supply of power to the shift control ECU 21 is started (time t5). As a result, power is not needlessly supplied from the capacitor 16 to the shift control ECU 21. Thus according to the back-up power source device 10 described in the present embodiment, the capacitor 16 can be used efficiently for the shift control ECU 21 when switching the shift range to the P range in response to a user instruction made in the event of a battery failure, in a situation where the back-up power source device 10 and the shift control ECU 21 are provided separately. The capacity of the capacitor 16 can be reduced, and the capacitor 16 can be made smaller and lighter as a result.

Additionally, the P range switch 24 and the door switch 31 provided in the vehicle can be used as the switch instructing unit through which the user makes an instruction to switch to the parking range in the event of a battery failure. It is thus unnecessary to provide the vehicle with an additional configuration for making switching instructions.

The present embodiment can also provide a back-up system 1 in which the capacitor 16 can be used efficiently for the shift control ECU 21 when switching the shift range to the P range in response to a user instruction in the event of a battery failure.

Note that the vehicle preferably is a vehicle provided with an electronic parking brake (EPB). This is because when a battery failure occurs, the electronic parking brake cannot be used, and thus the benefit of being able to park in the P range, as described in the present embodiment, is much more marked.

Other Embodiments

The present disclosure is not limited to the embodiment described above with reference to the drawings, and embodiments such as the following, for example, also fall within the technical scope of the present disclosure.

The foregoing embodiment describes an example in which the back-up control unit is constituted by the CPU 11, and the failure detection circuit 12, the monitor circuit 13, the discharge circuit 15, the ROM 18, and so on are provided as separate units. However, the present disclosure is not limited thereto. For example, the CPU 11, the failure detection circuit 12, and the monitor circuit 13 may be constituted by a single ASIC (application-specific IC). In other words, the back-up control unit may be provided with the functionality of the failure detection unit and the monitor circuit. Alternatively, the CPU 11, the failure detection circuit 12, the monitor circuit 13, the discharge circuit 15, and the ROM 18 may be constituted by a single ASIC. Furthermore, instead of a CPU, the back-up control unit may be constituted by multiple logic circuits, and the various processes may be executed by the logical configuration provided by the multiple logic circuits.

The foregoing embodiment describes an example in which the P range switch 24 and the door switch 31 constitute the switch instructing unit, which is used by the user to instruct a switch to the P range when the battery Ba has failed. However, the present disclosure is not limited thereto. For example, a push start switch may be added to the switches. Alternatively, a dedicated switch instructing unit for cases of battery failure may be additionally provided.

The invention claimed is:

1. A back-up power source device comprising a shift-by-wire device that switches a shift range of an automatic transmission using driving force from a motor and a back-up power source that supplies power to the shift-by-wire device, the back-up power source device supplying power from the back-up power source to a shift control unit included in the shift-by-wire device in the event of a battery failure in which the supply of power from a battery is lost, the back-up power source device further comprising:

a failure detection unit that detects the battery failure;

a monitor unit that, when the battery failure has been detected by the failure detection unit, monitors a user's operation of a switch instructing unit that instructs the shift range to be switched to a parking range, and generates an instruction signal in response to the operation of the switch instructing unit; and a back-up control unit, wherein the back-up control unit executes:

a battery failure determination process of determining whether or not the battery failure has been detected by the failure detection unit;

when it is determined that the battery failure has been detected in the battery failure determination process, a switching instruction determination process of determining, on the basis of the instruction signal generated by the monitor unit, whether or not the instruction to switch has been made; and when it is determined that the instruction to switch has been made in the switching instruction determination process, a shifting instruction process of starting power supply from the back-up power source to the shift control unit and instructing the shift control unit to shift to the parking range.

2. The back-up power source device according to claim 1, wherein the monitor unit monitors a parking range switch that, functioning as the switch instructing unit, indicates a shift to the parking range, and a door switch that, functioning as the switch instructing unit, indicates whether a door of the vehicle is open or closed; and in the switching instruction determination process, the back-up control unit determines that the instruction to switch has been made in the case where an instruction signal indicating that the parking range switch has turned on or an instruction signal indicating that the door switch has been turned on has been received.

3. The back-up power source device according to claim 1, wherein the back-up control unit further executes a prohibition process of prohibiting the supply of power from the back-up power source to the shift control unit when it has been determined that the battery failure has been detected in the battery failure determination process.

4. The back-up power source device according to claim 1, wherein the back-up power source is constituted by a capacitor.

5. A back-up system comprising:

the back-up power source device according to claim 1;

a shift-by-wire device including the shift control unit; and a body control module that can be connected to a door switch that, functioning as the switch instructing unit, indicates whether a door of a vehicle is open or closed, wherein the shift control unit executes a process of shifting to the parking range in response to an instruction to shift to the parking range from the back-up control unit.

6. The back-up power source device according to claim 2, wherein the back-up control unit further executes a prohibition process of prohibiting the supply of power from the back-up power source to the shift control unit when it has been determined that the battery failure has been detected in the battery failure determination process.

7. The back-up power source device according to claim 2, wherein the back-up power source is constituted by a capacitor.

8. The back-up power source device according to claim 1, wherein the back-up power source is constituted by a capacitor.

* * * * *